US012570085B2

(12) United States Patent
Ben Ezra et al.

(10) Patent No.: US 12,570,085 B2
(45) Date of Patent: Mar. 10, 2026

(54) METHOD AND SYSTEM FOR CHARACTERIZING A PRINTING PLATE ON A PRESS

(71) Applicant: Advanced Vision Technology (A.V.T.) Ltd., Hod Hasharon (IL)

(72) Inventors: Barry Ben Ezra, Ramat Hasharon (IL); Lior Haviv, Hod Hasharon (IL); Shahar Golan, Petach-Tiqwa (IL)

(73) Assignee: Advanced Vision Technology (A.V.T.) Ltd., Hod Hasharon (IL)

( * ) Notice: Subject to any disclaimer, the term of this patent is extended or adjusted under 35 U.S.C. 154(b) by 141 days.

(21) Appl. No.: 18/220,647

(22) Filed: Jul. 11, 2023

(65) Prior Publication Data

US 2024/0017539 A1 Jan. 18, 2024

Related U.S. Application Data

(60) Provisional application No. 63/389,519, filed on Jul. 15, 2022.

(51) Int. Cl.
*B41F 33/00* (2006.01)
*B41F 5/24* (2006.01)
(Continued)

(52) U.S. Cl.
CPC ............ *B41F 5/24* (2013.01); *B41F 13/0024* (2013.01); *B41F 27/14* (2013.01); *B41F 31/18* (2013.01); *B41F 33/0009* (2013.01)

(58) Field of Classification Search
CPC .................................................. B41F 33/0027
See application file for complete search history.

(56) References Cited

U.S. PATENT DOCUMENTS 8,931,410 B2 1/2015 Noy
9,393,772 B2 7/2016 Menashe et al.
(Continued)

FOREIGN PATENT DOCUMENTS

EP 3251850 A1 * 12/2017
WO WO-2010146040 A1 * 12/2010 ............ B41F 27/005
WO 2022112308 A1 6/2022

OTHER PUBLICATIONS

English translation of EP 3 251 850 to Krumpelmann et al., publication date Dec. 6, 2017. (Year: 2017).*
(Continued)

*Primary Examiner* — Leslie J Evanisko
(74) *Attorney, Agent, or Firm* — Buchanan Ingersoll & Rooney PC

(57) ABSTRACT

A system including a non-contact plate sensor and a processor configured to characterize a configuration of a plate based upon information received from the sensor, such as position on a press or plate quality. The processor is configured to initiate a responsive action based upon the characterized configuration. A related method includes setting pressure of a printing plate relative to an ink-receiving substrate and register of a printing plate relative to another printing plate on a press, without generating printed waste. The non-contact plate sensor measures a distance of the printing surface of the plate relative to the sensor in locations along the plate longitudinal axis to characterize a starting configuration of the plate. The plate longitudinal axis is adjusted to correspond with a desired position of the plate for exerting a desired pressure on the substrate, based upon a difference between the measured starting position and the desired position.

19 Claims, 3 Drawing Sheets

(51) Int. Cl.
*B41F 13/00* (2006.01)
*B41F 27/14* (2006.01)
*B41F 31/18* (2006.01)

(56) References Cited

U.S. PATENT DOCUMENTS

| | | | | |
|---|---|---|---|---|
| 11,247,450 | B2 | 2/2022 | Rostalski | |
| 2007/0089625 | A1 * | 4/2007 | Grinberg | B41F 33/0027 101/484 |
| 2010/0011978 | A1 * | 1/2010 | Whitelaw | B41F 13/24 101/130 |
| 2020/0016916 | A1 | 1/2020 | Sievers et al. | |
| 2020/0353742 | A1 * | 11/2020 | Schwab | B41F 5/24 |
| 2021/0174042 | A1 | 6/2021 | Sievers et al. | |
| 2021/0206190 | A1 | 7/2021 | Barbier et al. | |

OTHER PUBLICATIONS

"Self-mixing Interferometry", Wikipedia, downloaded from the internet, https://en.wikipedia.org/wiki/Self-mixing_interferometry, on Jul. 10, 2023, 4 pages.

* cited by examiner

METHOD AND SYSTEM FOR CHARACTERIZING A PRINTING PLATE ON A PRESS

CROSS-REFERENCE TO RELATED APPLICATIONS

This application claims priority from U.S. Provisional Application Ser. No. 63/389,519, titled METHOD AND SYSTEM FOR CHARACTERIZING A PRINTING PLATE ON A PRESS, filed Jul. 15, 2022, incorporated herein in its entirety by reference.

BACKGROUND OF THE INVENTION

Printing plates for flexographic printing presses are made of a flexible polymer material, which transfers ink from the press inking system to the target substrate according to the required image. In order to print the required image, the top surface of the plate is patterned such that ink is transferred only where required by the print design. This is achieved by the patterning process (e.g. applying a halftone pattern corresponding to the image) selectively removing material from the plate, such that the polymer plate is thicker in areas where the design is to be printed and thinner where the design is not to be printed. This removal may be performed by any number of methods, at least some of which include laser-based technology (e.g. laser engraving, direct laser-curing of photopolymer, or laser-ablation of a mask through which photopolymer plate is exposed), which can create very fine details, as required in printing. The differences in plate thickness (which may also be referenced in terms of height relative to a plate floor) cause ink to be collected by the plate only in the areas where the plate is thicker, thus enabling transferring ink to a substrate in a manner that reflects the design. When ink is required to cover the entire print surface, such as to provide a white background on a transparent plastic packaging material, an un-patterned plate (or patterned only with a non-image-specific roughness for optimizing ink transfer) may be used for transferring ink to the entire surface.

The ink transfer mechanism of a flexographic press includes an ink supply system, an anilox roller and a printing plate. The role of the anilox roller is to collect ink from the ink supply system and transfer it to the printing plate, in a very uniform manner—to create uniform color density. The anilox and plate cylinders are essentially parallel to each other and to the surface of the substrate to which the ink is to be transferred. The distance between the plate and anilox axis, as well as the distance between the plate axis and the substrate surface, are not constant, as the plate and anilox circumferences/diameters are not constant and also not always uniform along their axis. The distances can be modified also by a motorized mechanism which is controlled by software and/or an operator. Two motors drive the distance of each roller—one on each side of the length of the axis.

New plates and anilox rollers may be purchased with a variety of thicknesses to suit different print needs, and these may get worn as they are used, and so their circumference/diameter (i.e. for a plate as mounted on the cylinder) will get smaller. The wear of the plate and anilox may not be uniform across the entire length. The non-uniformity is typically a result of incorrect settings of the distances between the plate and anilox, such as an operator setting a smaller distance on one side of the axis than on the other side. It should be noted that typical anilox materials are harder than plate materials, and indeed most are made of a robust metal, and thus the anilox wears very slowly. In practice, it is acceptable to consider the anilox roller dimensions as constant and uniform. On many presses, the process of setting pressure is simplified by assuming that the anilox has known dimensions, essentially circumference—thus there is a known distance between the anilox surface and a reference point in the press, such as the axis of the plate. In such circumstances, setting pressure is a matter of deciding how to position the plate (see below) and then moving the anilox so that its surface is at a known distance to the plate surface. This invention covers also those cases in which the anilox diameter is not known, thus the need for a scan of the anilox.

As depicted in FIG. 2A, in preparing a plate 218 for loading on a press, it is first mounted onto a cylinder 216, which is then loaded on to a printing deck in the press. In mounting on the cylinder, the plate may have a flexible planar form that is adhered to the surface of the cylinder by use of self-adhesive tape or self-adhesive backing material, or the plate may be in the form of a sleeve that fits securely around the cylinder, or the plate may be adhered to a mounting sleeve 217 disposed on the cylinder. As used herein, the term "plate" refers to any configuration, including planar forms and sleeves. The press deck rotates the cylinder along its axis 260, such that when the plate contacts the anilox roller, ink is transferred to the plate pattern at that deck. Ink adheres to the ink-transfer (printing) areas on the plate surface, and as the plate continues to rotate, the ink is then deposited on the substrate. Several such plates may be required on a press, each to control the transfer of a separate layer of ink, typically of different colors. Each such printing plate is mounted on a different print deck on the press, substantially parallel to each other, and substantially parallel to the substrate, and configured to transfer ink in series, one after the other. The result is an image built by the accumulating layers of ink one on top of the other.

A typical flexographic printing press may have as many as 8-10 printing decks, each of which may have a different color of ink, and an appropriate different plate, to transfer that ink to the correct places on the substrate. It is not uncommon to print a series of very similar jobs, one after the other, with only some of the plates being changed from one print job to the next. For example, the same label or food packaging is printed in different languages, and there is a need to switch only two plates, for example, where the language has an impact. An operator might switch only one of these, thus creating an incorrect mixture of languages in the print. This is very difficult to identify, especially if the operator does not read the languages involved.

The transfer of ink to the substrate must be coordinated and registered in x (i.e. plate width) and y (i.e. plate movement direction) coordinates between the multitude of decks, so as to achieve the correct buildup image. In order to do so, also the printing deck x and y positions are positionable by motorized positioners and can be adjusted to align to some known location in the press coordinate system. As mentioned before, the transfer of ink to the anilox, plate and substrate needs to be adjusted also in the z direction (height perpendicular to the x-y plane), thus controlling the amount of ink transferred to the substrate. All the plate axes rotate at the same speed, so that once the plates are brought into register, they remain in register.

The process of setting the alignment in x and y directions is referred to herein as "register setting," while the process of setting the proper z position is referred to herein as "pressure setting." An optimal pressure setting is typically considered to be the pressure at which the entire image is printed with good quality, and even a small reduction in pressure would cause ink to not be transferred somewhere in the image. The optimal pressure setting does not necessarily require that all axis be parallel to each other, as this may not accommodate for the practicalities of plate and anilox wear.

A press operator can set pressure and register manually, although it is very wasteful in time and material, as it requires multiple trial and errors of printing and tweaking, each requiring printing of tens of meters on the printing substrate. There are several approaches to automating the setting of pressure and register, such as in U.S. Pat. No. 8,931,410, assigned to the common assignee of the present application, in which specially designed diagnostic patterns (i.e. a “setup pattern” as referred to therein) are included in the print design, so that a camera system can find and use these to diagnose the print quality and send instructions to the press control system to change the position of the rollers. Additional ideas known in the art can be found in U.S. Pat. No. 9,393,772, assigned to the common assignee of the present application, in which no special patterns are required, and the algorithms automatically use whatever patterns are in the actual print design, in order to optimize pressure and register setting. These settings are designed to be optimal, such that an operator does not need to tweak the settings after the automated algorithm has executed and communicated the required settings to the press control software.

There are also known solutions that require special pre-work to be done, in order to set pressure and register without printing. Exemplary pre-work may include scanning the plate on a special scanner, storing information in at least one RFID chip inserted into the plate cylinder sleeve. Such approaches are not optimal, and typically require some tweaking on the press, which creates additional waste. An additional approach has been described in U.S. Pat. No. 11,247,450, which uses a 3D camera to obtain 3D images of the polymer printing plate on an off-press scanner, uses the captured images to create a 3D topography of the plate, simulates a printed image, defines changes in pressure settings and then simulates the print image again, to validate correctness of the proposed setting. The subject patent does not explain how the data is transferred from the off-press scanner, or how this scanner is calibrated with the press. It likewise does not offer any suggestion for how one would set register without printing, and, as such, it does not offer a fully automated pressure and register setting without waste.

State-of-the-art solutions that offer a fully automated pressure and register setting still require some wasted printing of material. To minimize the amount of waste, a commercial printer typically needs to invest in an expensive scanning unit, and then invest time and labor every time a plate is to be used in production—scanning each plate and somehow transferring the information to the press, when the plate is loaded on the press. The use of an off-press scanner creates a challenge of transferring the scan information to the press, plus the challenge of different coordinate systems on the press and scanner. The latter can be overcome by calibration of the scanner to the press, but this needs to be done for each press, and both press and scanner are not perfectly stable—thus creating a need to calibrate frequently. Lack of proper calibration and relatively low resolution scanning generate the need to perform pressure and register adjustments on the press even for plates that were scanned pre-print. Practically speaking, this system does not provide perfect results, and thus many meters still must be printed while fine-tuning the pressure and register. The output of such fine-tuning is dependent on the skill of the person doing the work.

Thus, there is still a need in the art to minimize waste by providing a fully automated pressure and/or register setting solution that reaches acceptable pressure and/or register settings without printing waste material, without needing any subsequent adjustments on press, without being dependent on the skill of an operator, and/or without scanning on a scanner separate from the press. In addition, there is a need in the art to reduce other sources of waste in the printing process, by providing a means to automatically inspect the quality of printing plates, both on and off press, as well as verifying that the correct set of plates is mounted on the press. There is also a general need to enable monitoring the quality or wear of plates during and after the print job itself, to avoid printing bad material.

SUMMARY OF THE INVENTION

One aspect of the invention relates to a method for setting pressure of a printing plate mounted on a plate cylinder of a printing press relative to a substrate for receiving ink from the printing plate, without generating printed waste. The method includes providing at least one non-contact plate sensor on the press positioned to measure a distance of a printing surface of the plate relative to the sensor in a plurality of locations along a longitudinal axis of the plate. A starting configuration of the plate is characterized by measuring with the at least one non-contact plate sensor a starting set of distances between the printing surface of the plate relative to the sensor in the plurality of locations, and converting the measured set of distances into a starting position of the longitudinal axis of the printing plate in a predetermined coordinate system. The method includes determining a desired position of the longitudinal axis of the printing plate in the predetermined coordinate system corresponding to a desired pressure to be exerted by the printing plate on the substrate, and adjusting a location of one or more endpoints of the plate longitudinal axis of the printing plate to correspond with the desired position, based upon a difference between the measured starting position and the desired position.

Embodiments of the method may further include characterizing a starting position of a longitudinal axis of the anilox roller and adjusting a position of one or more endpoints of the longitudinal axis of the anilox roller to correspond with a desired position of the longitudinal axis of the anilox roller relative to the longitudinal axis of the printing plate, based upon a difference between the characterized starting position of the longitudinal axis of the anilox roller and the desired position of the longitudinal axis of the anilox roller. Such embodiments may include providing at least one non-contact anilox sensor on the press positioned to measure a distance of an outer surface of an anilox roller relative to the sensor along the longitudinal axis of the anilox roller, wherein the step of characterizing the starting configuration of the anilox roller includes measuring a starting set of distances with the at least one non-contact anilox sensor. Characterizing the starting position of the longitudinal axis of the anilox roller may include retrieving a known position from computer memory, and the method steps may further include storing the desired position as the known position in computer memory.

The printing press may have a plurality of printing decks each configured to transfer ink from a respective printing plate onto the substrate for receiving the ink and the printing press provides a zero signal indicator, in which case the method includes repeating the foregoing steps or sub-combinations thereof for each of the plurality of printing decks, and synchronizing register of the respective printing plates with one another using the zero signal indicator.

The non-contact plate sensor and/or the non-contact anilox sensor may include a self-mixing interferometry (SMI) sensor. The non-contact plate sensor may include a relief profile sensor and/or the non-contact anilox sensor may include a direct measurement sensor.

Another aspect of the invention relates to a printing press having one or more printing decks, each deck configured to transfer ink from a printing plate onto a substrate for receiving the ink. The printing plate includes at least one non-contact plate sensor positioned to measure a distance of a printing surface of the printing plate relative to the sensor along a longitudinal axis of a cylinder on which the printing plate is mounted, and a processor in communication with the at least one non-contact plate sensor, the processor configured to characterize a configuration of the plate based upon information received from the at least one non-contact plate sensor, the processor further configured to initiate at least one responsive action based upon the characterized configuration of the plate. Where the characterized configuration of the plate indicates a need to modify a location of the plate relative to the substrate so that the printing plate establishes a desired pressure relative to the substrate, the at least one responsive action may include adjusting a location of one or more endpoints of the cylinder longitudinal axis based upon distances measured by the at least one non-contact plate sensor as compared to required distances for establishing the desired pressure.

The printing press may further include an anilox roller having a longitudinal axis, the anilox roller configured for inking the printing plate, and at least one non-contact anilox sensor positioned to measure a distance of an outer surface of an anilox roller relative to the non-contact anilox sensor along the longitudinal axis of the anilox roller. In such embodiments, the processor is further configured to characterize a first configuration of the anilox roller based upon a first set of distances measured with the at least one non-contact anilox sensor and to adjust a location of one or more endpoints of the anilox roller longitudinal axis, based upon measured distances provided by the at least one non-contact anilox sensor as compared to required distances for establishing a desired location of the anilox roller relative to the printing plate.

In the embodiment in which the printing press includes a plurality of printing decks, each printing deck configured to transfer ink from a respective printing plate mounted on a respective plate cylinder onto the substrate for receiving the ink, the printing press may further comprise a zero signal indicator in communication with the processor, wherein the processor is configured to synchronize registration of the respective printing plates with one another based upon information communicated from the zero signal indicator.

The processor may be configured to cause the at least one non-contact plate sensor to measure distances at a plurality of defined locations on the printing plate, to compare the measured distances at the defined locations to stored information characterizing an expected or previous configuration of the plate, and to provide a responsive output based upon any deviations detected by the comparison. The plurality of defined locations may include locations defined to enable the processor to determine if the printing plate is different from an expected plate or damaged or worn as compared to the previous configuration of the plate. The non-contact plate sensor may include a self-mixing interferometry (SMI) sensor or a relief profile sensor.

Yet another aspect of the invention relates to a system for characterizing a printing plate. The system includes at least one non-contact plate sensor positioned to measure a distance of a printing surface of the printing plate at a plurality of defined locations within the area embodied by the printing plate; and a processor in communication with the at least one non-contact plate sensor. The processor is configured to cause the at least one non-contact plate sensor to measure distances at a plurality of defined locations on the printing plate, to compare the measured distances at the defined locations to stored information characterizing an expected or previous configuration of the plate, and to provide a responsive output based upon deviations detected by the comparison. The system may be installed on a printing press or on a structure other than a printing press, such as a plate mounting machine, a plate imaging machine (such as a plate imaging machine having a writing head configured for imaging an undeveloped plate, and a sensor head configured for measuring distances from the sensor head of features on a developed plate) or a dedicated plate quality check machine (which may have a drum or flatbed arrangement).

When the system is installed on a printing press, the characterized configuration of the plate may indicate a need to modify a location of the plate relative to a substrate mounted on the printing press for receiving ink, in which case the responsive action may include adjusting position of a cylinder on which the printing plate is mounted, based upon distances measured by the at least one non-contact plate sensor as compared to required distances for establishing the desired pressure. The non-contact plate sensor may include a self-mixing interferometry (SMI) sensor or a relief profile sensor.

In the foregoing systems, the processor may be configured to cause the at least one non-contact plate sensor to measure distances at a plurality of defined locations on the printing plate, to compare the measured distances at the defined locations to stored information characterizing an expected or previous configuration of the plate, and to provide a responsive output based upon deviations detected by the comparison. The plurality of defined locations may include locations defined to enable the processor to determine if the printing plate is different from an expected plate or damaged or worn as compared to the previous configuration of the plate.

The system may also include computer memory accessible to the processor for retrieving the stored information characterizing the expected or previous configuration of the plate, wherein the stored information includes a design file corresponding to the printing plate, one or more characterizations each performed at a different time, or a combination thereof. Stored information may include a value for the number of prints made using the printing plate between each of the one or more characterizations, in which case the processor may be configured to determine a wear rate and predict a remaining lifetime of the plate based upon the wear rate. Stored information may also include information obtained by a first non-contact plate sensor and information obtained by a second non-contact plate sensor different than the first non-contact plate sensor. At least one of the first or second non-contact plate sensors may be installed on a printing press, with the processor configured to cause the non-contact sensor to obtain the measured distances at the defined locations and to compare the obtained measured distances to the stored information during an active printing operation of the printing press using the printing plate.

DETAILED DESCRIPTION OF THE INVENTION

One aspect of the invention includes a system and method for precisely setting pressure and register between all decks participating in a printing job on a press, without the need to transfer any ink to the printing plates or to the substrate. Unlike any existing method or system, the press does not print at all while the system sets the pressure and register, the system is completely automatic, and the result is precise, so that no tweaking is required and no material is wasted. Once completed, the press can start printing to set other press parameters, or to start production.

Figure 1B:
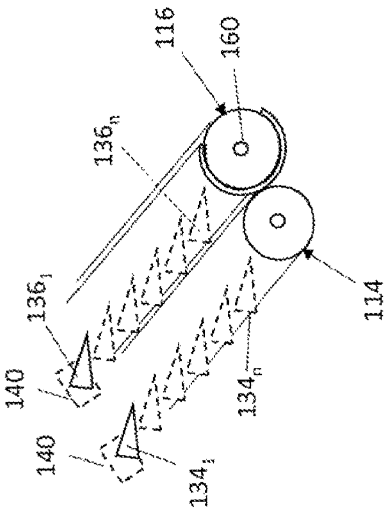
FIG. 1B schematically depicts an isolated portion of FIG. 1A in perspective, showing exemplary sensors or sensor positions configured to measure distances from the sensors of an anilox roller and a plate on a plate cylinder.
Figure 1A:
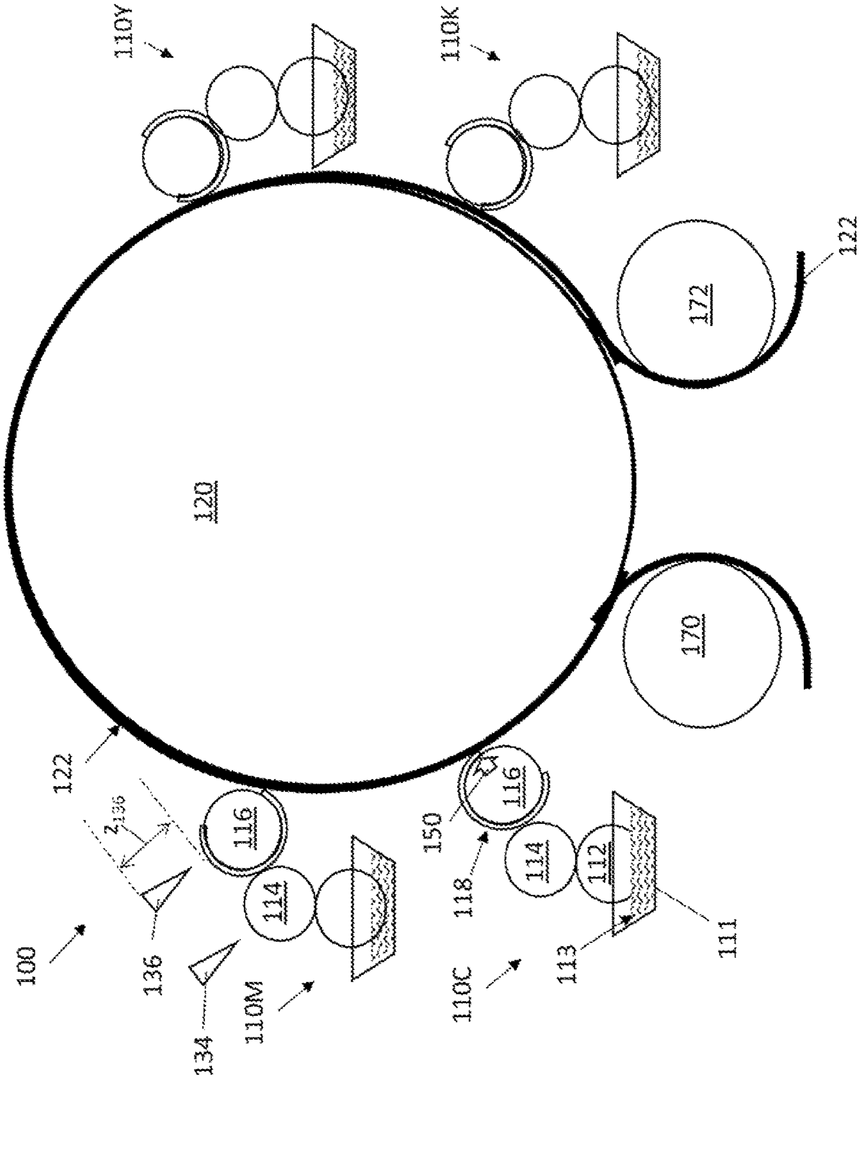
FIG. 1A schematically depicts a side view of an exemplary central impression drum for receiving a substrate to be printed and a plurality of printing decks configured to print on the substrate attached thereto.

FIGS. 1A and 1B depict components of an exemplary flexographic printing press 100, namely a central impression drum 120 and a plurality of printing decks 110C, 110M, 110Y, 110K, each deck corresponding to a particular ink color (e.g. 110C is a deck for printing cyan, 100M is a deck for printing magenta, 110Y is a deck for printing yellow, and 110K is a deck for printing black). Although illustrated for a CMYK color system it should be understood that the invention is not limited to any particular number of decks or any particular colors of ink (or other components such as varnish, etc.) to be printed. As illustrated with respect to printing deck 110C, each printing deck includes an ink reservoir 111 containing ink 113, a fountain roller 112 that is in direct contact with the ink reservoir and transfers ink to an anilox roller 114, which then transfers ink to the printing plate 118 mounted on printing cylinder 116. Printing plate 118 then transfers ink from the printing plate to the substrate 122 mounted on central impression (CI) cylinder or drum 120. Substrate 122 may comprise a web of material that unspools from a roll (not shown) and that winds around various components (e.g. tensioning spools 170, 172) before and after the CI drum. Components of each deck 110C, 110M, 110Y, 110K are similar, although the components are labeled on fewer than all of the decks in the diagram, to reduce clutter.

Embodiments include a plurality of non-contact distance measurement sensors 134, 136 on the press, each of which has an accurate known location within the press coordinate space. These distance measurement sensors measure the distance between the sensor reference plane and the surface of the respective plate or anilox. The distance measurement sensors may each be mounted on one or more motorized traverse units 140 which allows them to travel the full width of the press between locations $\mathbf{134}_1$ and $\mathbf{134}_n$ and back, and between locations $\mathbf{136}_1$ and $\mathbf{136}_n$ and back, respectively. Although shown with one traverse unit 140 for each sensor, a single unit for both sensors may be provided. Or, in alternative arrangements, a plurality of sensors $\mathbf{134}_1$ to $\mathbf{134}_n$ and $\mathbf{136}_1$ to $\mathbf{136}_n$ may be employed, or a stationary array of sensors or of sensor components may be employed that are capable of measuring the required distances at each of the locations $\mathbf{134}_1$ to $\mathbf{134}_n$ and $\mathbf{136}_1$ to $\mathbf{136}_n$. The distance and angles between the sensor and the press are also known at each point of measurement/travel of the respective sensor. In addition, each of the plate and anilox axes have accurately known positions within the same press coordinate space. Furthermore, the distance between one deck to another, or from each deck to some reference point in the press, is known. Furthermore, a signal is sent to the system when the rotational position of a designated position 150 of each plate cylinder reaches a specific rotational position (e.g. 12 o'clock), such that the rotational position of the plate is accurately known to the system relative to a reference rotational position in the press. Additionally, there are known distances between each deck plate axis 160 and the surface of the substrate 122 on which printing will eventually take place.

Exemplary methods include calibration of the x- and z-axes of each deck, such as in accordance with the following exemplary methods.

Calibrating X-Axis:

Once the sensors and traverses are mounted on the press, a one-time calibration process may be executed to map the x positions of each device on each deck relative to the press. This process may utilize a shared reference point on the press, which may be a mark machined into the press, or onto a calibration cylinder or calibration jig that is mounted just for this purpose, and removed after calibration if it disturbs regular operation of the press.

Calibrating Z Position:

Once the sensors and traverses are mounted on the press, a one-time calibration process may be executed to map the z positions of each device on each deck relative to the press. This can be simply the vertical distance between a defined sensor reference point and a projected orthogonal vector to the surface of the substrate (e.g. distance $z_{136}$ as shown in FIG. 1A).

Start Measurements:

Once a plate is loaded onto a deck, the measurement scan starts at the extreme left position, namely x0. At least one device 136 measures the distance (z136) from the device to the top surface of the plate 118, and optionally at least one device 134 measures the distance from that device to the anilox top surface. The respective distances between each sensor 134, 136 and the respective axes of the plate cylinder and anilox roller are measured and stored when the sensor(s) and traverse(s) are first installed, at each x location along the width of the press and plate/anilox, to accommodate any lack of straightness or rotation angles of the device as it moves along the traverse. The measurement at each point is thus a precise measure of the distance between the sensor and the plate or anilox surface. The distance from the plate cylinder axis 160 to the sensor 136 is known at each point, and the distance between the plate cylinder axis and the substrate 122 is known at each point, therefore it is possible to calculate the distance between the plate top surface and the substrate. Similarly, if measuring the distance of the anilox surface from its respective sensor 134, the distance between the anilox and plate surfaces can be similarly calculated. The device moves from position to position along the x-axis, and the measurement repeats across the entire plate/anilox length at predetermined intervals, which may be regular or irregular intervals.

The step of the device along the traverse may be fine or coarse. The steps may be performed without any knowledge of the design being printed, or may be optimized in order to measure only those positions from which pressure and register settings can be learned, omitting areas in which there is no value in measuring for the particular plate to be printed. For example, if a given x location has no printable features throughout the y range of the plate pattern, the plate is not intended to contact the anilox or the substrate in that respective x-y area, and measuring the plate distance to the anilox or to the substrate at such x locations within the x-y area provides no additional value for setting pressure or register. Additionally, areas may be automatically pre-selected from the design file to minimize the number of y locations at which measurements are taken. For pressure setting, it is preferable to measure at least two positions along the longitudinal axis, and more preferable to measure at least three well-chosen columns of positions, most preferably in columns positioned relatively left, right, and center. The term "center" as used in the foregoing sentence does not refer necessarily to a location exactly in the center of the plate or centered between the left and right columns, but is only an expression of relative direction meaning that it is located between the left and right columns. Likewise, the "left" and "right" columns are relatively left or right of center, respectively, and may be different distances from the exact center and/or from the respective left or right edges of the plate. For register setting, the algorithm may seek features that are easily recognized and enable accurate register setting.

Zero Signal:

During normal operation on press embodiments as described herein, and thus also during the measurement process, the press may issue an electronic signal when a single specified "Master Plate" 150 passes, e.g., the 12 o'clock position in the press, or equivalently by using some other means for identifying that the substrate has progressed by one print repeat length. This is typically called the "Zero Signal" and is sometimes also called "Start of Frame." This is a very accurate signal known in the art that is used to synchronize between all the printing decks, so that they all start the print repeat at the exact same place along the substrate. This signal is stored in the measurement data, for use by the register setting.

Setting Pressure:

Once an entire plate scan has been completed, the distances between the plate top surface at that print deck and the substrate are known across the substrate width. If the anilox is scanned, then the distances between the plate top surface and the anilox surface are known. Each set of measurements may be fit to a plane representing the surface of the anilox roller or plate, respectively. The measured distances are used for calculating the distance (if any) to move the left side and the right side of the plate and of the anilox to obtain optimum pressure—i.e. so that the "plane" of each is parallel to the other and to a plane that defines the substrate, and the distance between the plate plane and the substrate plane is zero or a very small known negative value. At zero distance the plate and substrate are so close that the minute layer of ink on the plate will transfer to substrate. A negative distance implies that the substrate pushes up against the plate polymer at the point of contact. A positive value is not possible, as this would imply that the substrate does not get close enough to the plate to collect ink from it. The negative value may be required for some types of plates, if these require more substantial pressure in order for the ink to transfer. This negative value will be very small and will depend on the type of plate (what kind of polymer). The solution includes a list of plate types and the final distance to the substrate—zero or some small negative value.

Setting Register:

Once an entire plate scan has been completed, the measurement data can be used for identifying pre-defined features that serve as register reference marks. The method for identifying these is to correlate between the pdf or design file or any other digital file that was used in the manufacturing of the plate, and which provides the information on where the plate is to transfer ink to the substrate, and then seek the appropriate measured distances in the plate measurement. Knowing where these are in the file guides where to seek them in the measurements. The smallest distance measurements occur where ink is to be transferred, and thus correlate to the printing points in the design file. The selected areas for comparing the two data sets may be specially inserted register marks or any features in the design determined by the algorithm. Once identified, each register mark or feature now has a known location on the plate relative to the x axis of the deck, and relative to the "Zero Signal" of the press. This information permits direction calculation of how much each deck must move in x and in y directions in order for all decks to be synchronized in x and y, and thus print the correct image.

Measuring Distance:

Many non-contact measurement sensors are known in the art, capable of directly measuring the distance between a sensor and a measured object. Some are capable of directly measuring the distance only to static objects, and other to a moving object, such as a rotating printing plate or anilox roller. Of those able to measure the distance to a moving object, there are some that measure precise distances and some only rough measurements. There are devices that are able to measure fast moving objects and others that can measure only slow-moving objects. For example, capacitance sensors are used in various applications for distance measurements, but these are not very precise and are typically slow.

Figure 2A:
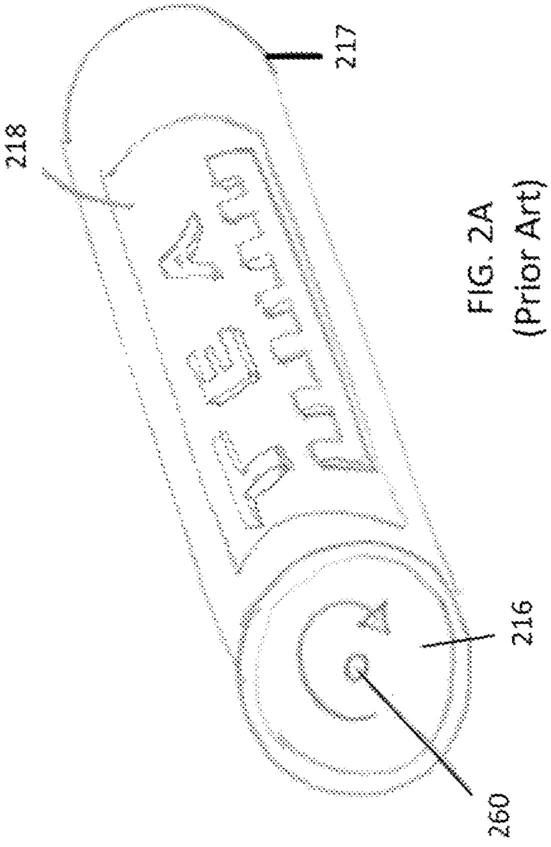
FIG. 2A (Prior Art)
FIG. 2A schematically depicts an isometric view of an exemplary plate on a plate cylinder, as is known in the art.
Figure 2B:
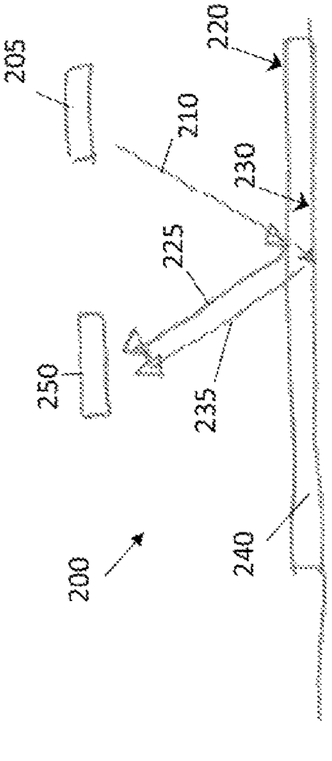
FIG. 2B (Prior Art)
FIG. 2B schematically depicts the exemplary reflections of a standard prior art optical based measurement system on a printing plate.

In order to achieve the combination of non-contact, fast and precise, most prior art devices 200, as depicted in FIG. 2B, use some method for illuminating the surface and using the reflection of light in order to measure. Many such sensors are appropriate and accurate for measuring distances to opaque surfaces, but cannot accurately measure the distance to a printing plate, as printing plates are typically not opaque. In the case of such printing plates, a ray of measurement radiation 210 (e.g. laser light) emanating from a source 205, for example, will both create a first reflection 225 off the top surface 220 of the plate 240 in the direction of a detector 250 and penetrate into the polymer and create a second reflection 235 off the bottom surface 230 of the plate, as shown schematically in FIG. 2B. For all practical purposes, given the speed of light and the small difference in the time it takes the photons to travel both paths, these two reflections occur simultaneously, and look like just one reflection to standard sensors. Thus, commonly used sensors and 3D cameras, using structured light or by projecting a grid of lines, are not able to differentiate between the two reflections. These methods, as well as laser interferometer or similar methodologies known in the art, are typically unable to reach conclusive measurements on such confusing surfaces.

One way to overcome the inherent limitation of the interaction of light with non-opaque printing plates is to spray a coating over the plate. Such coatings have been developed specifically for the purpose of 3-D scanning of transparent or highly reflective objects, and are available on the market including so-called "vanishing sprays" (such as made by AESUB of Recklinghausen, Germany), which self-evaporate after some period of time. While operable, this is a disfavored approach for use on a printing plate, however, for many reasons, including the concern that the spray may collect in small crevices on the plate design and obscure some of the fine details. Additionally, there is some concern that the spray may cause a change to the chemical properties of the polymer, and thus have a detrimental impact on the ink transfer function. Also, if the time to evaporate is too long, press operators may not accept losing such valuable press time.

Figure 4B:
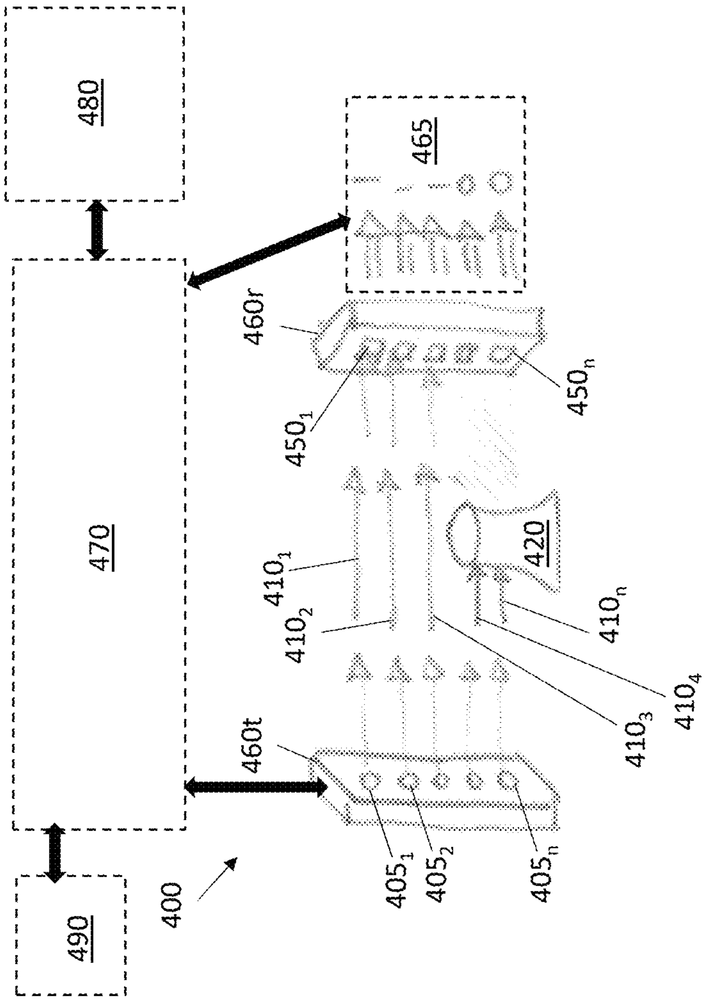
FIG. 4B schematically depicts details of the second non-contact sensor system.
Figure 4A:
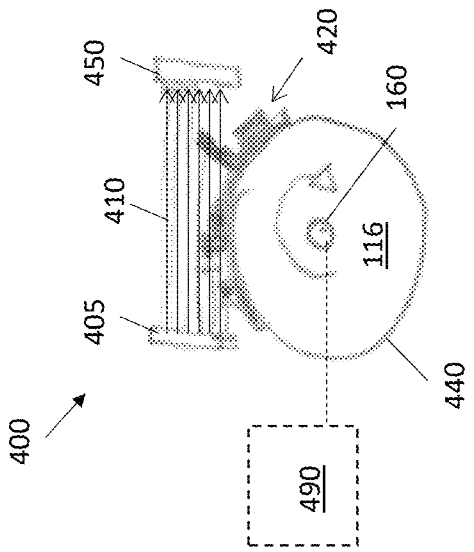
FIG. 4A schematically depicts the operation of a second non-contact sensor system for indirectly measuring the distance to the top surface of a plate. This system does not indirectly derive a sectional thickness of a printing plate.

Another means to overcome the limitation of using light-based sensors to directly measure the distance to the plate is to use light-based sensors to indirectly measure the distance, by means of obstruction, such as in the system 400 illustrated in FIGS. 4A and 4B. One or more pairs of light transmitters 405 and photoelectric receivers 450 are positioned opposite each other. Each transmitter emits a beam of light 410 directed to the corresponding receiver, which receiver produces a digital signal 465. If the light reaches the sensor, the receiver outputs a value of "1" and if something (e.g. plate structure 420) obstructs the light, the receiver then outputs a value of 0. An array of such a pairs of transmitters $\mathbf{405}_{1\text{-}n}$ and corresponding receivers $\mathbf{450}_{1\text{-}n}$ may be constructed on vertical bars 460*t*/460*r* respectively, to provide obstruction feedback at various heights above a surface. The vertical distance between adjacent pairs may be very small, to enable high resolution results. Instead of discrete light emitters, the transmitter may incorporate a laser scanning component, which generates an essentially continuous line of light that reaches the face of the receiver. Although depicted with five such pairs 405/450, it should be understood that the invention is not limited to any particular number of transmitters/receivers, or to any particular methodology for indirect measurement, including wavelength of the measurement radiation. And, although shown with discrete transmitters and receivers placed on opposite sides of the plate and operating on a light obstruction principle, it should be understood that a system operating using reflected radiation (e.g. using a time of flight for measurement of distances) with receivers and transmitter on the same side of the plate may also be used for indirect measurement. Additionally, technology based on both obstruction and reflection may be used together—using both reflected light and any light that does get through the polymer, as signals. Indirect methodologies that measure a side profile of relief plate features are referred to collectively herein as "relief profile sensors," encompassing any and all operable technologies, including but not limited to obstruction, reflection, and combinations thereof.

If an obstruction (e.g. a printing feature) on the surface (e.g. of the plate) is high enough, the output at the appropriate receiver will go to 0. Such a set of transmitter/receiver units may be used to measure the height of the plate top surface. For this purpose, the transmitters and receivers are disposed at a sufficient height so that the top beam is not disturbed by the thickest printing plate in use, and positioned on opposite sides of the plate 440, such that the plate rotates between them, as depicted in FIG. 4A. The bottom light beam $\mathbf{410}_n$ (FIG. 4B) is always obstructed by the press deck or the cylinder, even without a plate-providing a means for ensuring the device is operative. In preferred embodiments, the bottom-most receiver will therefore always output a "0" signal due to blockage of the respective beam from the transmitter, and likely also the next one or more receivers going up the bar from the plate surface (e.g. beam $\mathbf{410}_4$ in FIG. 4B) while at least the top most receiver (e.g. the respective receivers for beams $\mathbf{410}_{1\text{-}3}$ in FIG. 4B) will always output a "1" signal. The pairs in-between will change from 1 to 0 and back according to the height of the plate at the measured positions. In comparison to direct measurement, this method may not be capable of measuring the height to all points on some plate designs. An example of this is a case in which a few mm of very low structure on the plate are bounded on all sides by very high structures of the same height, and thus fall in the shadow of these high structures. As the plate rotates, the first high structure will start to obstruct the beams at height (i) moving upwards towards the leak at height (j), and as the first high structure moves through the peak, already the second high structure will obstruct the beams at height (i) and continue similarly to the previous high structure. The low structure between the two high points will not be able to obstruct the beams. From this limitation we learn that the method is not able to create a complete measurement of all distances from the sensor to the plate top surface, but we also learn that it will not miss any of the highest points. As our goal is to measure the distances to the highest points on the plate, which are the printing points, this method enables locating the printing points on the plate and thus enabling pressure and register setting. Although depicted with respect to a plate sensor, it should be understood that a similar sensor may also be used in connection with an anilox roller, if and when required.

The exemplary indirect measurement unit (e.g. relief profile sensor system 400) may include various optics and internal processors to facilitate its designed operation, such as processors that convert the digital signal 465 to height or distance measurements, none of which are shown. Sensor system 400 is communicatively connected to a processor 470, which is communicatively connected to computer memory 480. "Communicatively connected" as used herein may include any type of communication protocols known in the art, including but not limited to wired or wireless connections and combinations thereof, without limitation. The processor is configured (i.e. programmed with machine readable instructions embodied in transitory or non-transitory computer media) to characterize the plate based upon the measured distances and to compare the plate characterization to information stored in computer memory. For example, the information stored in memory includes expected measurements required to provide a desired amount of pressure between the plate and the substrate. The computer memory may be any type of computer memory known in the art. The processor is configured to determine a deviation from the expected measurements, and cause one or more positioners 490 configured to position the axis 160 of the printing plate cylinder 116 so that the location of the plate conforms to the expected measurements. The one or more positioners 490 may be any motorized, computer controllable positioners for positioning the axis of the plate cylinder in a printing deck, as may be known in the art.

Various printing systems are known in the art with various computer controlled motorized positioners, the details of which are not discussed herein further, as the invention is not limited to any particular positioner embodiment.

Although the invention may use any sensor that is able to measure the distance to transparent polymer plates, and is not limited to any specific type of measurement sensor, a preferred embodiment utilizes a measurement system 300 comprising a measurement sensor 360 incorporating a self-mixing semiconductor laser interferometer (SMI). Such a device is inherently designed to transmit and receive a laser beam 310 that causes photons to reflect off a target surface and create an interruption inside the laser cavity 305. The interruption is dependent on the distance travelled by the photons, thus providing a measurement of distance. The general principles of self-mixing interferometry (SMI) are known in the art, and are not repeated here. A detailed explanation may be found at https://en.wikipedia.org/wiki/Self-mixing interferometry, incorporated herein by reference, which states that "self-mixing or back-injection laser interferometry is an interferometric technique in which a part of the light reflected by a vibrating target is reflected into the laser cavity, causing a modulation both in amplitude and in frequency of the emitted optical beam. In this way, the laser becomes sensitive to the distance traveled by the reflected beam thus becoming a distance, speed or vibration sensor. FM and AM versions of SMI are available.

Such a device can be modified to differentiate between photons returning from a multitude of surfaces of a series of targets, and specifically to differentiate between photons in path 335 reflected off the top surface 220 and photons in path 325 reflected off the bottom surface 230 of the transparent or non-opaque printing plate 240. Applying SMI as disclosed herein enables fast, non-contact, precise measurement of distances from the sensor to the plate top surface and to the plate bottom surface. Such a laser device provides accurate results and is capable of measuring the distance to the surface of the plate while it is rotating on the plate deck axis in the press.

Figure 3:
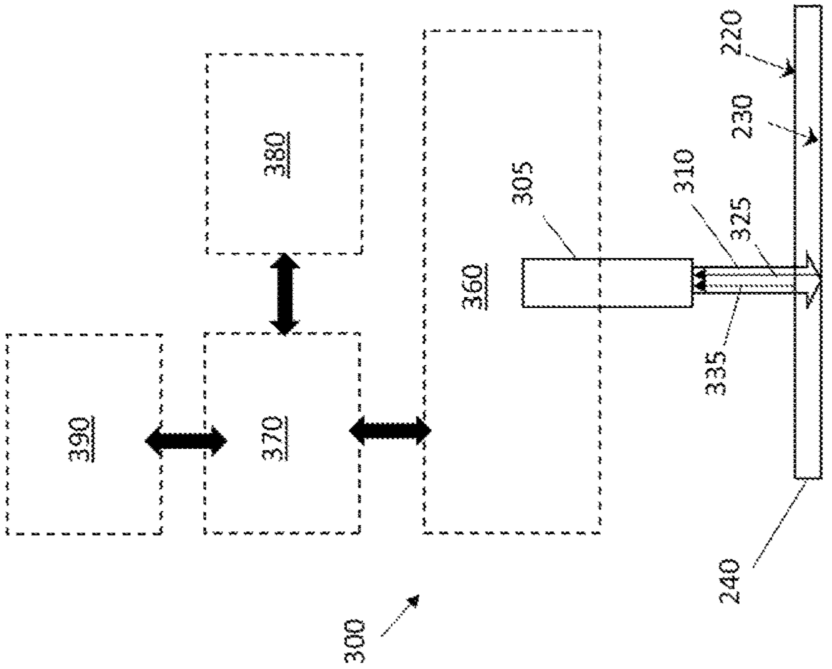
FIG. 3 schematically depicts the operation of a mixed signal interferometry non-contact distance sensor system for directly measuring the distance to the top and bottom surfaces and thus deriving the thickness of a printing plate.

Although illustrated schematically in FIG. 3, it should be understood that the schematic locations of the beam paths 310, 325, and 335 as depicted for clarity are not intended to illustrate the actual relationships between those paths (which are typically coincident) in an exemplary SMI unit 360. Likewise, the exemplary SMI unit may include various optics and internal processors to facilitate its designed operation, none of which are shown. The SMI unit 360 is communicatively connected to a processor 370, which is communicatively connected to computer memory 380. "Communicatively connected" as used herein may include any type of communication protocols known in the art, including but not limited to wired or wireless connections and combinations thereof, without limitation. The processor is configured (i.e. programmed with machine readable instructions embodied in transitory or non-transitory computer media) to characterize the plate based upon the measured distances and to compare the plate characterization to information stored in computer memory. For example, the information stored in memory includes expected measurements required to provide a desired amount of pressure between the plate and the substrate. The computer memory may be any type of computer memory known in the art. The processor is configured to determine a deviation from the expected measurements, and cause one or more positioners 390 configured to position the axis 160 of the printing plate cylinder 116 so that the location of the plate conforms to the expected measurements.

Both direct and indirect measurement devices may benefit from the minimized cost of providing a single or minimal number of measurement sensors that traverses the width of a plate/anilox, while the target surface is rotating, in order to gradually scan and measure the entire plate/anilox. A single device on a motorized bridge may be provided, or to expedite the scanning motion, several devices may be installed across the width of the press, sharing the same traverse and motion system. The output of the device at each point is the distance between the device sensor and the plate or anilox. Alternatively, a very large number of measurement devices with small gaps between them may be mounted on a rigid connecting device that will remain static and not require a traverse at all.

As discussed herein, whenever referencing measurement of a distance, the collective measurement set also defines the circumference of the plate or anilox at any and all x locations, and thus the coordinates of the plate and anilox may also be expressed in radial coordinates or may be expressed in the form of circumferences (rather than planes, as described above), and from this the angle between them and by how much to move may also be readily calculated. Thus, although described herein primarily expressing measurements as distances only, it should be understood that the mathematics used for expressing the relative relationships among the components in the coordinate space of the press is not limited to any particular expression.

Measurement Positions:

In the case of a single or few measurement devices, one method may include scanning the rotating plate/anilox in an x-x direction from one side to the other, across the entire length, collecting distances over the entire surface. In order to expedite the scanning process, it is possible to skip areas in which there is a known lack of features that are worthwhile or valuable to measure. In the case of a printing plate, there are many empty areas, where the design has no features that are to be printed. The design file of the print job, from which the plates were created, may be utilized to skip over such blank areas, and thus shorten the scanning process. Additional areas may be skipped, even if they do have printed features that add value to the goal of the scanning process. For example, for setting register, it is sufficient to scan a very small number of features on each plate, whose positions are known from the design file, as once they are located, their position provides all the information needed to move the plate to the correct position in the x and y axis. Similarly, for pressure setting, it is sufficient to scan a small number of columns, for example left, right and center, where there are known features, in order to generate enough information on the circumference of the plate at those positions, or the angle of the plate to the substrate, and the distances on left and right of the plate surface to the substrate.

Measuring and Monitoring for Quality Control

The foregoing sections focused on embodiments relating to setting printing press parameters, specifically register and pressure, in flexographic printing presses. There are, however, additional advantages and uses for a measuring system installed on a press as described. Specifically, the measuring systems and methods as described above may also be utilized for inspecting the quality of the printing plate itself. Printing plates are known to suffer from deterioration during use, whether because of the friction between the plate and the anilox and substrate, or because of mechanical damage caused during handling of the plate. For example, a plate may be damaged when demounting a plate from the underlying cylinder to which it was adhered using a sticky back tape, wherein removal of the tape causes mechanical damage to the finer details on the plate. Even new plates may have quality problems and defects, caused by the chemical and mechanical processes involved in plate making. These quality issue differ depending on plate type and the quality of processing equipment and operators. For example, some plate types require processing that includes solvents that remove un-polymerized material. Others use brushes for the same purpose. The brushes and solvents can cause damage to details in the plate, if not all processing is properly set.

Accordingly, systems and methods for performing direct or indirect plate measurements may also be applied on the press for inspecting the plate for defects. The entire plate may be scanned and measured, and these measurements may be compared to the design file, to check if the height at each point in the scan is indeed the correct height per the design. If a piece of plate has broken off, or if the plate has been worn down through use, the actual circumference or height measurement at some points will not agree with the expected circumference or height based upon the design file. When the plates are loaded on the press, the scan can provide not only the setting of pressure and register without inking or printing, but can also be used to ensure that the plates have acceptable quality to be used for the print job. In addition, the comparison to the design file may also identify situations in which some incorrect plate or plates have been loaded onto the press, such as for example, when a mixture of plates from two very similar jobs (e.g. jobs with only some content the differs in language, as mentioned in the background section). Scanning the plates on the press and comparing the height measurements to the design file provides information that may also be used for verifying that all the plates are the right ones for the print job. This will lead to an additional saving of waste material and time, over and above the setting of pressure and register.

The same approach can be applied to yet a further embodiment of the plate quality scanning, by using all the above-mentioned elements in an off-press embodiment. The direct or indirect distance measurement may be accomplished using any of the same sensor systems and methods mentioned above, mounted in any one of the configurations described above, but installed on a host structure other than a printing press, and used only for quality inspection of the plates. In one embodiment, the host structure may be a plate mounting machine, in which plates are mounted onto the sleeve when preparing them for loading onto a press. This would be a natural and efficient place to perform quality checks in the plate workflow, as it would reduce the probability of a damaged plate reaching the press. In another embodiment, the host structure may be a plate imaging machine, equipped with a dual-head—one standard writing head that patterns the plate, and a second measuring head that measures the height of the plate at defined or all locations in the plate after development of the plate. New plates may be loaded into the plate imaging/inspection system, where they will be patterned by the writing head, exit the machine in order to proceed to the conventional processing steps of exposure and removal of unwanted material, and then in the case of a need to inspect the plate, it will again be loaded into the imaging/inspection machine, but now will be measured by the measurement head—finding the plate heights at some or all points. The hosting structure may also be a dedicated plate quality check machine designed for this specific purpose, and may include a mechanism for loading and unloading plates, and scanning select points or all of the plate. The plate quality check apparatus may be drum-based or may have a flatbed arrangement.

Once the plate is loaded on the press and in use, the plate measurement solution as described herein may be used to monitor deterioration in the plate structure, periodically measuring the height of select or all points on the plate to identify any damage that occurs during execution of the printing job. Detectable damage may include damage caused from the frictions involved, from a chemical response to the ink, or from damage by some mechanical element in the printing press. Occasional height measurements may be compared to the height measurements made when the plate was first loaded, or even to height measurements stored from a previous print run, to evaluate deterioration. Height measurements may be stored from each run using the plate, along with information in the form of a value for the number of prints (e.g. 10,000) made using the plate during each run, such a processor analyzing the stored information may determine a wear rate based upon the rate of deterioration per total number of prints made, and may predict a remaining lifetime of the plate (e.g. in estimated number of prints or in machine time (e.g. hours), in view of an expected number of prints per elapsed time) based upon the wear rate. Stored information about each plate may be tagged with unique identifier corresponding to the printing plate, and each plate may have a machine-readable code corresponding to the unique identifier in or on the printing plate, such as, without limitation, as described in any one of U.S. Published Application Ser. Nos. US20210174042A1 ("METHOD FOR PERSISTENT MARKING OF FLEXO PLATES WITH WORKFLOW INFORMATION AND PLATES MARKED THEREWITH"); US20200016916A1 ("SYSTEM AND PROCESS FOR PERSISTENT MARKING OF FLEXO PLATES AND PLATES MARKED THEREWITH"); US20210206190A1 ("PHOTOSENSITIVE PRINTING FORM FOR A FLEXOGRAPHIC PRINTING METHOD COMPRISING VISIBLE AND NON-PRINTABLE INFORMATION, AND METHOD FOR PREPARING SUCH A PRINTING FORM"), incorporated herein by reference in their entireties. Accordingly, the systems as described herein may be configured to identify a plate by its unique identifier, retrieve stored information relating to the plate and associated with the unique identifier in computer memory, and perform the various operations as described herein, including comparisons of new measurements to stored information, in real time during press set up and/or in operation.

Likewise, the systems as described herein, in particular SMI techniques, may be used for scanning, measuring, and inspecting the condition of the anilox roller for quality as well, with comparison to prior measurements to detect changes indicative of wear or damage, and tracking the condition over time. Any type of direct measurement technique (e.g. reflective measurement techniques such as generally shown in FIG. 2B, using any type of radiation, including visible wavelengths associated with creating a photograph commonly perceptible to a human or a machine) may be used for the anilox, which lacks the technical challenges of a translucent plate mounted on a cylinder, as described above. Notwithstanding this, there is additional value in distance measurements by SMI as the anilox surface is divided into cells, which have a specified depth and shape. The depth and shape can be measured far more accurately by the SMI technique than by a camera. Information about the anilox may also be matched to unique identifiers for the anilox for tracking. The measurement systems as described herein for the plate and anilox may also be used for other components in the printing workflow, without limitation (e.g. the fountain roller) and may be components in an overall system for tracking and predictive monitoring, such as is described in WO2022112308A1—SYSTEM AND METHOD FOR TRACKING PRINTING SYSTEM METRICS AND PERFORMING PREDICTIVE MONITORING OF A PRINTING TOOL, listing one or more common inventors of the present application, and incorporated herein by reference.

For direct measurement embodiments such as the SMI embodiment described above, the plate may be disposed in a flat configuration or wrapped around a cylinder, whereas for indirect measurement embodiments, such as the relief profile sensor embodiment described above, the plate is mounted on a cylinder. In the on-press embodiments, plates are wrapped around a cylindrical sleeve in the traditional manner in which plates are configured during printing, thus enabling use of both embodiments. In some off-press embodiments, the plate may also be wrapped around a cylinder, such in a mounting machine, making it practical to use both indirect and direct measurement solutions. In the case of a dedicated plate quality check machine, both flat and cylindrical orientations may be designed into the machine, allowing the choice of either indirect or direct measurement solutions.

To summarize aspects of the invention, direct or indirect height measurements of printing plates may be utilized on-press and/or off-press to inspect the quality of a printing plate, and on-press to verify that the correct plates are loaded on the press, and to set register and pressure without printing. Similar measurements may be used for inspection of the anilox roller, both for quality and for alignment with the plate. Each and every one of these possibilities contributes to reducing the waste in printing.

The methods as described herein may include some or all steps executed by a computer processor programmed with machine readable instructions for causing the processor to execute the method steps. Likewise, any processors as described herein may be programmed with instructions for causing the processor to embody the configurations as described. The instructions, programming, or application(s) as described herein as associated with execution of may be software or firmware used to implement the device functions associated with the device such as the computer described throughout this description. Program aspects of the technology may be thought of as "products" or "articles of manufacture" typically in the form of executable code or process instructions and/or associated data that is stored on or embodied in a type of machine or processor readable medium (e.g., transitory or non-transitory), such as a memory of a computer used to download or otherwise install such programming.

Of course, other storage devices or configurations may be added to or substituted for those in the example. Such other storage devices may be implemented using any type of storage medium having computer or processor readable instructions or programming stored therein and may include, for example, any or all of the tangible memory of the computers, processors or the like, or associated modules.

It should be understood that all of the figures as shown herein depict only certain elements of an exemplary system, and other systems and methods may also be used. Furthermore, even the exemplary systems may comprise additional components not expressly depicted or explained, as will be understood by those of skill in the art. Accordingly, some embodiments may include additional elements not depicted in the figures or discussed herein and/or may omit elements depicted and/or discussed that are not essential for that embodiment. In still other embodiments, elements with similar function may substitute for elements depicted and discussed herein.

Any of the steps or functionality of the systems and methods as described herein may be embodied in programming or one more applications as described previously. According to some embodiments, "function," "functions," "application," "applications," "instruction," "instructions," or "programming" are program(s) that execute functions defined in the programs. Various programming languages may be employed to create one or more of the applications, structured in a variety of manners, such as object-oriented programming languages (e.g., Objective-C, Java, or C++), procedural programming languages (e.g., C or assembly language), or firmware. In a specific example, a third party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third party application can invoke API calls provided by the operating system to facilitate functionality described herein.

Hence, a machine-readable medium may take many forms of tangible storage medium. Non-volatile storage media include, for example, optical or magnetic disks, such as any of the storage devices in any computer(s) or the like, such as may be used to implement the steps herein described and/or shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A system for characterizing a printing plate, the system comprising:

at least one non-contact plate sensor positioned to measure a distance between the at least one non-contact plate sensor and a printing surface of the printing plate at a plurality of defined locations within the area embodied by the printing plate; and a processor in communication with the at least one non-contact plate sensor, the processor configured to cause the at least one non-contact plate sensor to measure distances between the at least one non-contact plate sensor and a plurality of defined locations on the printing plate, to perform a comparison of the measured distances at the defined locations to stored information characterizing corresponding distances for an expected or previous configuration of the plate, and to perform a responsive action based upon deviations detected by the comparison, wherein the responsive action comprises adjusting a position of a cylinder on which the printing plate is mounted, based upon the deviations detected by the comparison.

2. The system of claim 1, wherein the system is installed on a structure other than a printing press.

3. The system of claim 2, wherein the system is installed on a plate mounting machine, a plate imaging machine, or a dedicated plate quality check machine.

4. The system of claim 1, wherein the system is installed on a printing press.

5. The system of claim 4, wherein the expected or previous configuration of the plate indicates a need to modify a location of the plate relative to a substrate mounted on the printing press for receiving ink and the one responsive action comprises adjusting the position of the cylinder on which the printing plate is mounted, based upon the distances measured by the at least one non-contact plate sensor as compared to required distances for establishing a desired pressure.

6. The system of claim 4, wherein the printing press further comprises:

an anilox roller having a longitudinal axis, the anilox roller configured for inking the printing plate, and at least one non-contact anilox sensor positioned to measure a distance of an outer surface of an anilox roller relative to the non-contact anilox sensor along the longitudinal axis of the anilox roller;

wherein the processor is further configured to characterize a first configuration of the anilox roller based upon a first set of distances measured with the at least one non-contact anilox sensor and to adjust a location of one or more endpoints of the anilox roller longitudinal axis, based upon measured distances provided by the at least one non-contact anilox sensor as compared to required distances for establishing a desired location of the anilox roller relative to the printing plate.

7. The system of claim 4, wherein the printing press has a plurality of printing decks, each printing deck configured to transfer ink from a respective printing plate mounted on a respective plate cylinder onto the substrate for receiving the ink, the printing press further comprising a zero signal indicator in communication with the processor, wherein the processor is configured to synchronize registration of the respective printing plates with one another based upon information communicated from the zero signal indicator.

8. The system of claim 1, wherein the plurality of defined locations comprise locations defined to enable the processor to determine if the printing plate is different from an expected plate or damaged or worn as compared to the expected or previous configuration of the plate.

9. The system of claim 1, further comprising computer memory accessible to the processor for retrieving the stored information characterizing the expected or previous configuration of the plate, wherein the stored information includes a design file corresponding to the printing plate, one or more characterizations each performed at a different time, or a combination thereof.

10. The system of claim 9, wherein the stored information includes a value for a number of prints made using the printing plate between each of the one or more characterizations, and the processor is configured to determine a wear rate and predict a remaining lifetime of the plate based upon the wear rate.

11. The system of claim 9, wherein the stored information includes information obtained by a first non-contact plate sensor of the at least one non-contact plate sensor and information obtained by a second non-contact plate sensor of the at least one non-contact plate sensor, the second non-contact plate sensor of the at least one non-contact plate sensor being different from the first non-contact plate sensor.

12. The system of claim 11, wherein at least one of the first or second non-contact plate sensors is installed on a printing press and the processor is configured to cause the at least one of the first or second non-contact plate sensors to obtain the measured distances at the defined locations and to compare the obtained measured distances to the stored information during an active printing operation of the printing press using the printing plate.

13. The system of claim 1, wherein the at least one non-contact plate sensor comprises a self-mixing interferometry (SMI) sensor.

14. A method for setting pressure of a printing plate mounted on a plate cylinder of a printing press relative to a substrate for receiving ink from the printing plate, without generating printed waste, the method comprising:

a) providing the system of claim 5, including the at least one non-contact plate sensor on the printing press positioned to measure the distance of the printing surface of the plate relative to the sensor in a plurality of locations along the longitudinal axis of the plate;

b) characterizing a starting configuration of the plate by measuring with the at least one non-contact plate sensor a starting set of distances between the printing surface of the plate relative to the non-contact plate sensor in the plurality of locations, and converting the measured set of distances into a starting position of the longitudinal axis of the printing plate in a predetermined coordinate system;

c) determining a desired position of the longitudinal axis of the printing plate in the predetermined coordinate system, the desired position corresponding to the desired pressure to be exerted by the printing plate on the substrate; and d) adjusting a location of one or more endpoints of the longitudinal axis of the printing plate to correspond with the desired position of the longitudinal axis of the printing plate, based upon a difference between the starting position of the longitudinal axis of the printing plate as measured and the desired position of the longitudinal axis of the printing plate.

15. The method of claim 14, wherein providing the system further comprises providing an anilox roller having a longitudinal axis, the anilox roller configured for inking the printing plate, the method further comprising:

e) characterizing a starting position of the longitudinal axis of the anilox roller;

f) adjusting a position of one or more endpoints of the longitudinal axis of the anilox roller to correspond with a desired position of the longitudinal axis of the anilox roller relative to the longitudinal axis of the printing plate, based upon a difference between the characterized starting position of the longitudinal axis of the anilox roller and the desired position of the longitudinal axis of the anilox roller.

16. The method of claim 15, further comprising providing at least one non-contact anilox sensor on the press positioned to measure a distance of an outer surface of an anilox roller relative to the at least one non-contact anilox sensor along the longitudinal axis of the anilox roller, wherein step e) of characterizing the starting position of the anilox roller includes measuring a starting set of distances with the at least one non-contact anilox sensor.

17. The method of claim 15, wherein characterizing the starting position of the longitudinal axis of the anilox roller comprises retrieving a known position from a computer memory.

18. The method of claim 17, further comprising storing the desired position of the longitudinal axis of the anilox roller as the known position in the computer memory.

19. The method of claim 15, wherein the printing press has a plurality of printing decks each configured to transfer ink from a respective printing plate onto the substrate for receiving the ink and the printing press provides a zero signal indicator, the method comprising repeating each of steps a)-f) for each of the plurality of printing decks, and synchronizing register of the respective printing plates with one another using the zero signal indicator.

* * * * *